W. FRUHLING.

Gang-Plow.

No. 7,931. Reissued Oct. 30, 1877.

WITNESSES:

C. Clarence Poole

Geo. H. Graves

INVENTOR:

Wm. Fruhling per. atty.

A. H. Evans & Co.

UNITED STATES PATENT OFFICE.

WILLIAM FRUHLING, OF SAN JOSÉ, CALIFORNIA.

IMPROVEMENT IN GANG-PLOWS.

Specification forming part of Letters Patent No. 186,335, dated January 16, 1877; Reissue No. 7,931, dated October 30, 1877; application filed October 2, 1877.

*To all whom it may concern:*

Be it known that I, WILLIAM FRUHLING, of San José, California, have invented a new and useful Improvement in Gang-Plows, of which the following is a clear, full, and exact description, reference being had to the accompanying drawings, making a part of this specification, in which—

Figure 1:
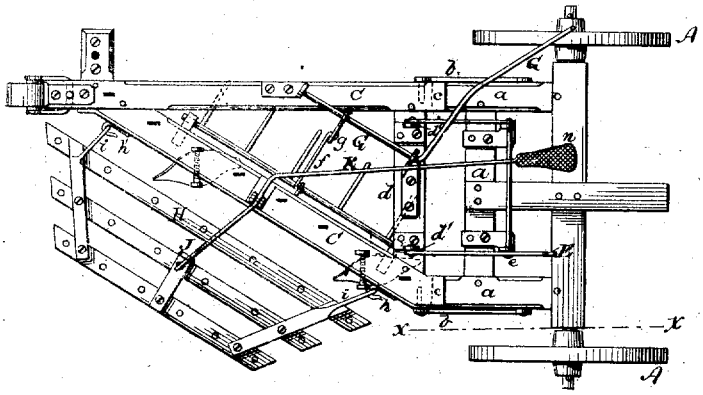
Figure 2:
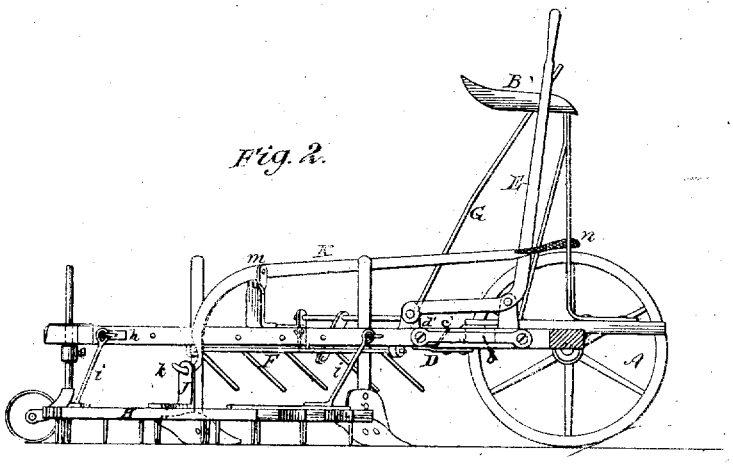

Figure 1 is a plan view of my improved plow. Fig. 2 is a vertical section through *x x* of Fig. 1.

My invention relates to gang-plows on which is a seat for the driver; and it consists in the several combinations of devices, hereinafter described and claimed.

To enable others skilled in the art to make and use my invention, I will proceed to describe the exact manner in which I have carried it out.

In the drawing, A A represent the wheels of the plow, centrally between which is secured the driver's seat B. The frame *a* is rigidly secured to the axle, as shown in Fig. 1. The plow-frame C is attached to forward frame *a* by means of the pivoted arms *b b*, and when in position for work the forward ends *c c* of the plow-frame rest on the plates D, attached to the under side of the forward frame *a*, as shown in Fig. 2. To the cross-beam *d* of the plow-frame are secured the lugs *d′ d′*, to which is attached the lever E, having its fulcrum *e* upon the forward frame, as shown in Fig. 2.

By this construction the driver in the seat B is enabled, by simply pushing forward the lever E, to raise the forward portion of the plow-frame to avoid obstructions.

On the plow-frame I also attach a swinging rake, F, on a line with the mold-boards, as shown in Fig. 1. To this rake is attached the jointed lever-rod *f*, the opposite end of the rod being secured to arm *g*, rigidly attached to the bent lever G.

Thus, by means of this bent lever G, the driver is enabled to rake away and remove all trash and dirt which may gather about and clog his plow.

To the outside of the plow-frame, and following in the wake of the plow, I attach the harrow H, as shown in Fig. 1, by means of the hooks *h h* and arms *i i*. Near the center of the harrow I secure a ring, *j*, into which fits the hook *k* on the short end of the lever K, having its fulcrum on the plow-frame at *m*, and being provided with a suitable foot-piece, *n*, whereby the driver is enabled, by pressing with his foot on the lever K, to raise the harrow above any obstructions that might lie in its way.

Having thus described my invention, what I claim as new, and desire to secure by Letters Patent, is—

1. The combination of the frame *a*, rigidly attached to the axle, with triangular plow-carrying frame C and bent lever E, pivoted directly to and arranged to lift the plow-frame from the front, all substantially as shown and described.

2. The forward frame *a*, provided with the wheels A A, seat B, and lever E, in combination with the plow-frame C, pivoted as described, and provided with the rake F and lever G, all constructed to operate substantially as and for the purpose set forth.

3. The plow consisting of the parts *a* and C, constructed as described, in combination with the swinging harrow H and lever K, all constructed to operate substantially as and for the purpose set forth.

WILLIAM FRUHLING.

Witnesses:
C. C. REDMOND,
F. M. PFISTER.